US009298981B1

(12) United States Patent
Ragnet et al.

(10) Patent No.: US 9,298,981 B1
(45) Date of Patent: Mar. 29, 2016

(54) CATEGORIZER ASSISTED CAPTURE OF CUSTOMER DOCUMENTS USING A MOBILE DEVICE (71) Applicant: Xerox Corporation, Norwalk, CT (US)

(72) Inventors: François Ragnet, Venon (FR); Damien Cramet, Saint-Martin-d'Hères (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/509,357

(22) Filed: Oct. 8, 2014

(51) Int. Cl.
*G06K 9/62* (2006.01)
*G06K 9/00* (2006.01)
*G06Q 20/04* (2012.01)
*H04N 1/40* (2006.01)
*H04N 1/00* (2006.01)
*H04N 1/107* (2006.01)

(52) U.S. Cl.
CPC ........ *G06K 9/00456* (2013.01); *G06K 9/00536* (2013.01); *G06Q 20/042* (2013.01); *H04N 1/00249* (2013.01); *H04N 1/107* (2013.01); *H04N 1/40062* (2013.01)

(58) Field of Classification Search
USPC ......................................... 382/190, 224, 229
See application file for complete search history.

(56) References Cited

U.S. PATENT DOCUMENTS

| 5,434,933 | A * | 7/1995 | Karnin | G06K 9/2054 382/192 |
| 7,231,082 | B2 * | 6/2007 | Lenoir | G06F 17/243 235/379 |
| 7,602,971 | B2 * | 10/2009 | Yeh | G06K 9/00449 382/176 |
| 8,249,343 | B2 * | 8/2012 | Perronnin | G06K 9/00442 382/168 |
| 2002/0196479 | A1 * | 12/2002 | Simske | H04N 1/00795 358/474 |
| 2006/0251326 | A1 * | 11/2006 | Yeh | G06K 9/00449 382/176 |
| 2007/0005356 | A1 | 1/2007 | Perronnin | |
| 2007/0258648 | A1 | 11/2007 | Perronnin | |
| 2008/0030798 | A1 * | 2/2008 | O'Neil | G07D 7/2058 358/448 |
| 2008/0069456 | A1 | 3/2008 | Perronnin | |
| 2008/0152228 | A1 * | 6/2008 | Tokuse | G06T 5/009 382/190 |
| 2008/0240560 | A1 * | 10/2008 | Hibino | G06F 17/30551 382/168 |
| 2009/0144033 | A1 | 6/2009 | Liu et al. | |
| 2009/0244556 | A1 * | 10/2009 | Chen | G06F 3/0481 358/1.5 |

(Continued)

OTHER PUBLICATIONS

Farquhar, et al., "Improving "bag-of-keypoints" image categorisation," Technical report, pp. 1-17 University of Southampton (2005).

(Continued)

*Primary Examiner* — John Strege
(74) *Attorney, Agent, or Firm* — Fay Sharpe LLP (57) ABSTRACT

A computer-implemented system and method for controlling document image capture are provided. The method includes identifying a categorization model for categorizing image frames and configuring an image capture device, based on the identified categorization model. A flow of frames of a same document captured with the configured image capture device is received and an image representation generated for each of a plurality of frames within the flow of frames. With the identified categorization model, for each of the plurality of frames, a confidence for at least one category is assigned to the frame based on the image representation. A category is assigned to the document when a threshold confidence for one of the at least one categories is assigned. An automatic capture of an image of the document is triggered based on the assigned category.

20 Claims, 3 Drawing Sheets

(56) References Cited

U.S. PATENT DOCUMENTS

| | | |
|---|---|---|
| 2010/0092084 A1 | 4/2010 | Perronnin et al. |
| 2010/0098343 A1 | 4/2010 | Perronnin et al. |
| 2010/0189354 A1 | 7/2010 | de Campos et al. |
| 2010/0191743 A1 | 7/2010 | Perronnin et al. |
| 2010/0318477 A1 | 12/2010 | Perronnin et al. |
| 2011/0026831 A1 | 2/2011 | Perronnin et al. |
| 2011/0040711 A1 | 2/2011 | Perronnin et al. |
| 2011/0091105 A1 | 4/2011 | Perronnin |
| 2011/0137898 A1 | 6/2011 | Gordo et al. |
| 2011/0285874 A1* | 11/2011 | Showering ............ G06K 9/033 348/231.99 |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2012/0230577 A1* | 9/2012 | Calman ............... G06Q 20/042 382/138 |
| 2013/0064444 A1 | 3/2013 | Gordo et al. |
| 2013/0290222 A1 | 10/2013 | Gordo et al. |
| 2014/0037184 A1* | 2/2014 | Gorski ................... G06K 9/78 382/138 |
| 2015/0002915 A1* | 1/2015 | Lebaschi ................ H04N 1/56 358/538 |
| 2015/0040002 A1* | 2/2015 | Kannan ................ G06F 3/0482 715/246 |

OTHER PUBLICATIONS

Perronnin, et al., "Fisher Kernels on Visual Vocabularies for Image Categorization," in CVPR, pp. 1-8 (2007).

Perronnin, et al., "Improving the Fisher Kernel for Large-Scale Image Classification," Proc. 11$^{th}$ European Conference on Computer Vision (ECCV): Part IV, pp. 143-156 (2010).

Sanchez, et al., "High-dimensional signature compression for large-scale image classification," CVPR, pp. 1665-1672 (2011).

* cited by examiner

CATEGORIZER ASSISTED CAPTURE OF CUSTOMER DOCUMENTS USING A MOBILE DEVICE

BACKGROUND

The exemplary embodiment relates to the information processing arts, classification arts, and related arts. It finds particular application in connection with systems and methods for the categorization of customer documents using a mobile device.

Since the advent of digital image sensors, categorization of customer documents captured as a digital image has become common. The captured digital document images may be used for a variety of data extraction purposes, for example, when a customer wishes to subscribe to a new contract with a company, such as a wireless cellphone provider. Much of the required information can be filled out using forms stored electronically on a PC or mobile device, such as a smartphone or tablet. However, a number of physical documents may still be needed, so that they can be scanned for verification. Such documents may include ID cards, driving licenses, passports, proof of address (household utility bills, rent receipts, crossed checks, bank account information, etc.). Traditionally, the scanned or photographed images of these customer documents are routed to a specific workflow to be categorized (automatically or manually by an operator) and processed to extract the required data. In the business context, time is often of the essence, as an ideal situation is that feedback and control of these categorized and processed documents is done in a little time as possible. In the ideal situation, the vendor can ask for additional information before the customer leaves the store, in the event that the particular document was not processed successfully.

When processing the data extracted by such documents, distortions such as noise, dimensions, skew, and rotation make automated categorization and further document processing more difficult. Document image capturing using the camera of a mobile device may increase this difficulty. For example, given a digital document image with one of the aforementioned distortions, miscategorization or non-categorization may occur, requiring intervention by a human operator to manually categorize the document. There are many applications which correct these distortions before categorizing, but these applications require distortion correction after the digital image of the document has been captured, increasing document processing time.

There remains a need for a system and method for improving the image capture and thus increasing the likelihood of successful categorization.

INCORPORATION BY REFERENCE

The following references, the disclosures of which are incorporated herein by reference in their entireties, are mentioned:

The following relate generally to document classification: U.S. Pub. Nos. 20070005356, 20070258648, 20080069456, 20090144033, 20100092084, 20100098343, 20100189354, 20100191743, 20100318477, 20110026831, 20110040711, 20110091105, 20110137898, 20120045134, 20120076401, 20120143853, 20130064444, and 20130290222.

BRIEF DESCRIPTION

In accordance with one aspect of the exemplary embodiment, a method for controlling document image capture includes identifying a categorization model for categorizing image frames and configuring an image capture device, based on the identified categorization model. A flow of frames of a same document captured with the configured image capture device is received. An image representation is generated for each of a plurality of frames within the flow of frames. With the identified categorization model, for each of the plurality of frames, a confidence for at least one category is assigned to the frame based on the image representation. A category is assigned to the document when a threshold confidence for one of the at least one categories is assigned. The automatic capture of an image of the document is triggered based on the assigned category.

At least one of the configuring of the image capture device, generating of the image representation, assigning a confidence, and assigning a category may be performed by a processor.

In accordance with another aspect of the exemplary embodiment, a system for controlling document image capture includes an image representation generator which receives a flow of frames of a same document captured with an image capture device and generates an image representation for each of a plurality of frames within the flow of frames. A categorizer categorizes image frames with a categorization model. For each of the plurality of frames, the categorizer assigns a confidence for at least one category to the frame based on the respective image representation and the model. The categorizer assigns a category to the document when a threshold confidence for one of the at least one category is assigned. A capture control component configures the image capture device. The capture control component triggers the automatic capture of an image of the document with the image capture device based on the assigned category. A processor implements the image representation generator, categorizer, and capture control component.

In accordance with another aspect, a method includes configuring an image capture device of a mobile device, based on parameters of a categorization model. A flow of frames of a same document captured with the configured image capture device is received. With a representation generator of the mobile device, an image representation for each of a plurality of frames within the flow of frames is generated. With a categorizer of the mobile device, for each of the plurality of frames, a confidence for at least one category is assigned to the frame based on the image representation. A category is assigned to the document when a threshold confidence for one of the at least one categories is assigned to a plurality of the frames. Automatic capture of an image of the document is triggered based on the assigned category.

At least one of the configuring of the image capture device, generating of the image representation, assigning a confidence, and assigning a category may be performed by a processor.

DETAILED DESCRIPTION

Aspects of the exemplary embodiment relate to a system and method for digitally capturing a customer document on a user device with assistance from a categorizer. In particular, one aspect of the system and method is directed to categorizing documents in real time based on analyzing document content received on a user device, which can be a mobile device. An image capture device on the mobile device can be a camera which displays a document image on the mobile device as a flow of frames. For example, given the elements of a) a categorization model, b) a method of automatically triggering the capture of a frame upon recognition of a category, and c) a categorized document image obtained from classification of image content appearing as a flow of frames, a document matching the format of a document class can be validated and sent to a server for subsequent processing.

Figure 1:
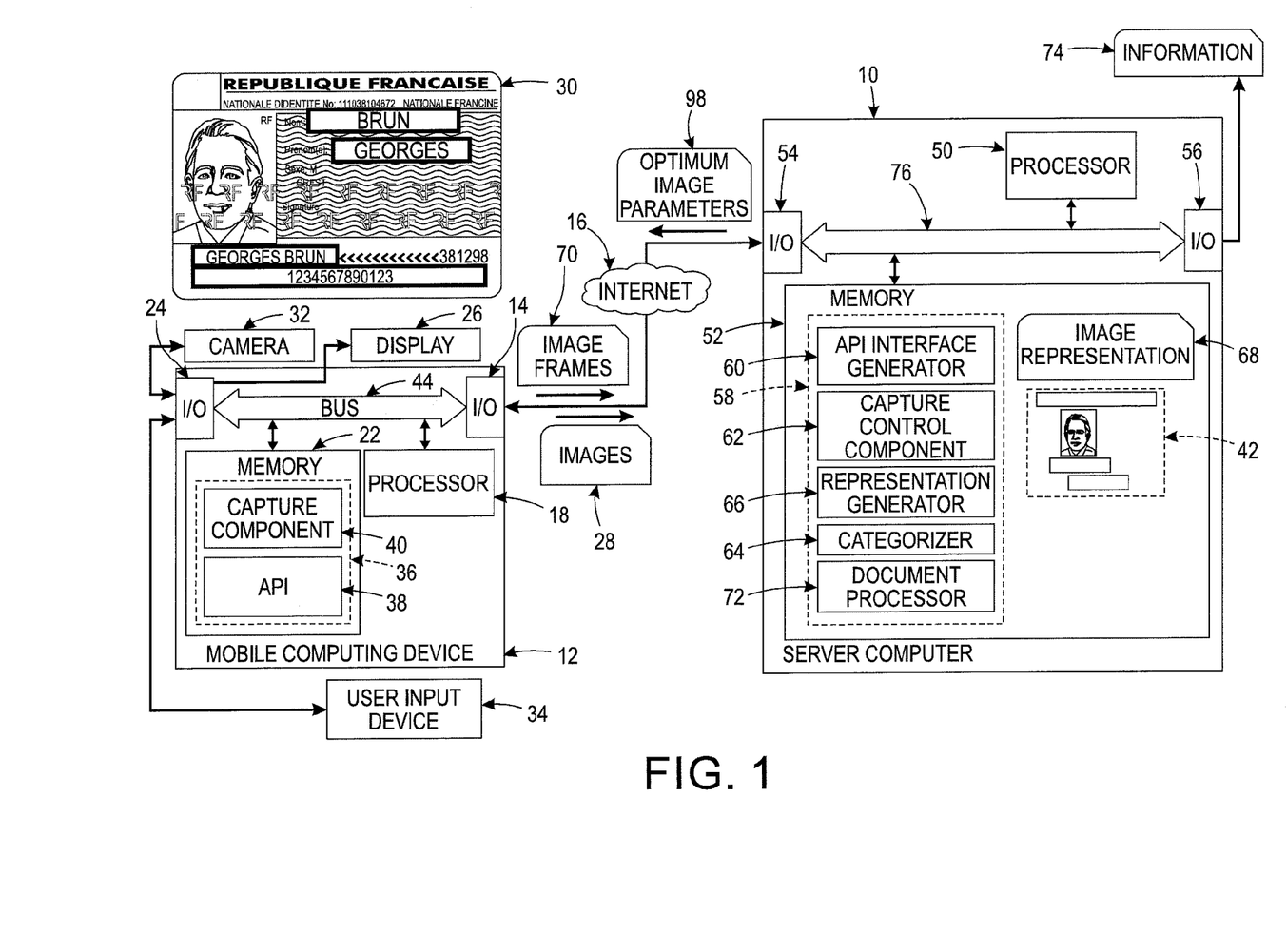
FIG. 1 is a functional block diagram of a system for remote control of automatic capture of documents.

With reference to FIG. 1, a mobile computing device-implemented system for categorizing and automatically capturing a digital image of a document is illustrated. The system may be implemented in one or more computing devices and the exemplary arrangement of computing devices is intended to be illustrative only.

The system includes a server computer 10, at a first location, and a mobile computing device 12, at a second location remote from the server computer. A network interface 14 enables the mobile device 12 to communicate with the server computer 10 or other devices, e.g., via network 16, such as the internet. The illustrated mobile device 12 includes a processor 18, which controls the overall operation of the mobile device by execution of processing instructions 20 which are stored in memory 22 connected to the processor. The mobile device 12 also includes a local input output interface 24 for communicating with one or more of a display 26, for displaying information to users as well as images 28 of a document 30 to be captured, an image capture device, such as a camera 32, and a user input device 34 for communicating user commands to the processor.

The memory 32 stores instructions 36 including an Application Program Interface ("API") 38 which controls a capture component 40 for controlling the camera 32 and for displaying a semi-transparent overlay 42 of a sample image on the display device for assisting a user in positioning the camera correctly for capturing the document 30. Hardware components 14, 24, 18, 22 are communicatively connected by a data/control bus 44.

Server computer 10 may be similarly configured with a respective processor 50, memory 52, and one or more network interfaces 54, 56. Memory 52 stores processing instructions 58 which are executed by the processor 50. The instructions 58 include an API interface generator 60 which controls a capture control component 62. The capture control component 62 communicates with a categorizer 64 to determine when to instruct the capture component 40 of the mobile device 12 to automatically trigger the capture of the document image 28. Further components of the categorizer 64 for categorizing the document image or camera frame 26 are detailed below. A representation generator 66 generates representations (image signatures) 68 of image frames 70 forming a sequence that are received from the camera 32. The exemplary image representation generator also includes instructions for generating a representation of the captured document image. The representations 68 are used by the categorizer 64 for categorizing the image frames. A category is assigned to the document image 28 based on the image signature. When the categorizer is able to assign a threshold confidence of a class to one of the image frames, the API interface generator 60 instructs the capture component 40 to capture an image of the current frame of the document. A document processor 72 is included to securely receive the document image 28 over the network 16 and optionally for processing the image 28 captured by the camera 32. Information 74 acquired through processing the document image 28, and/or the document image itself, may be output by the system. In one embodiment, document processor 70 includes instructions for further processing of the image, such as data extraction based on the assigned category. After processing, the image may be sent back to the mobile device and/or the extracted data and validation information 74. The various hardware components 50, 52, 54, 56 of the server computer 10 may be all connected by a bus 76.

The system may be adapted for various types of classification tasks, such as categorization, wherein the system receives as input a sequence of images 70 to be analyzed by the categorizer 64 in real time.

The components 60, 62, 64, 66, 70 may be embodied in hardware or software or a combination thereof, as illustrated.

The computer 10 may include one or more computing devices, such as a PC, such as a desktop, a laptop, palmtop computer, portable digital assistant (PDA), cellular telephone, tablet computer, pager, webcam, combination thereof, or other computing device capable of executing at least part of the instructions for performing the exemplary method.

The mobile device 12 may include one or more computing devices, such as a PC, such as a desktop, a laptop, palmtop computer, portable digital assistant (PDA), cellular telephone, tablet computer, pager, webcam, combination thereof, or other computing device capable of executing part of the instructions for performing the exemplary method. In one embodiment the mobile device is a portable device such as a smartphone or tablet computer.

The digital processor or processors 18, 50 can each be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 2, can be used as the processor.

The memory or memories 22, 52 may each represent any type of non-transitory computer readable medium such as random access memory (RAM), read only memory (ROM), magnetic disk or tape, optical disk, flash memory, or holographic memory. In one embodiment, the memory 22, 52 each comprises a combination of random access memory and read only memory. Exemplary memory 22, 52 stores instructions for performing the exemplary method and data used and generated therein, as well operating instructions for operating the computer or computers 10, 12.

The network interface or interfaces 14, 24, 54, 56 allows the mobile device or server computer to communicate with other devices via a computer network 16, such as a local area network (LAN) or wide area network (WAN), or the internet, and may comprise a modulator/demodulator (MODEM) a router, a cable, and and/or Ethernet port.

The user input device 34 may represent a graphical user interface (GUI) or touch or writable screen, and/or a cursor control device, such as mouse, trackball, or the like, for inputting text and for communicating user input information and command selections to the processor which may be mounted to the mobile device for access by a user.

A "document" is used herein to mean an electronic (e.g., digital) or physical (e.g., paper) recording of information. In its electronic form, a document may include image data, audio data, or video data. Image data may include text, graphics, or bitmaps.

In general, each document image 28 and each frame 70 includes image data for an array of pixels forming the image.

The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.).

Figure 2:
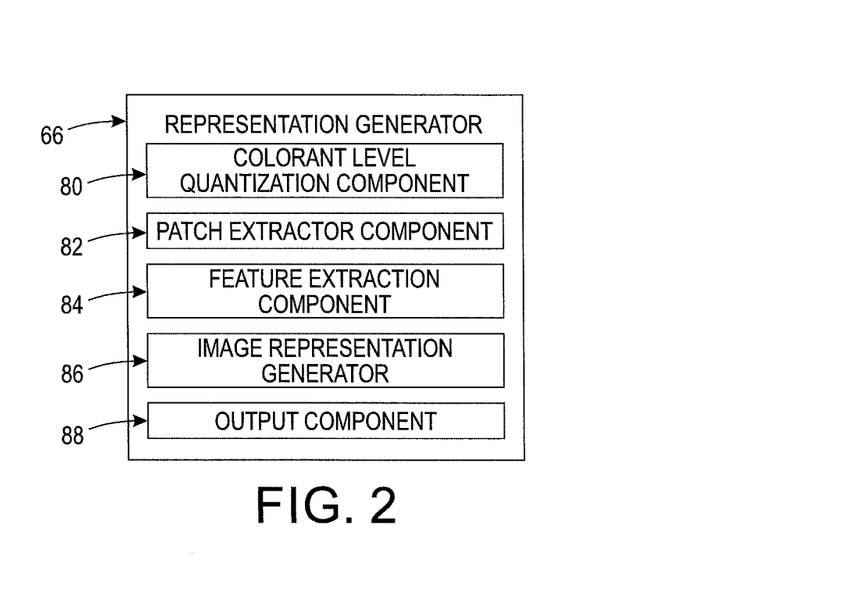
FIG. 2 is a functional block diagram of an image representation generator of FIG. 1.

With reference to FIG. 2, the image representation generator 66 includes various components for processing the image during categorization. Such components include an optional colorant level quantization component 80, which quantizes pixel colorant values (e.g., grey levels) in the document image (unnecessary for a binary image). A patch extractor component 82 extracts plural (generally multiple) patches in the document image 28 or frame 70, e.g., at two or more different scales. A feature representation generator component 84 extracts features, or local descriptors, and computes a statistical summary, unique to each patch, which is a multidimensional representation of each patch based on extracted features from each frame in the flow of frames. An image representation generator 86 then aggregates the statistical summaries corresponding to the different patches of the frame 70/document image 26 (and training images) to produces a vector representation of the entire image. An output component 88 outputs the vector representation of the entire document image, also referred to as an image signature, based on the statistical summaries.

Figure 3:
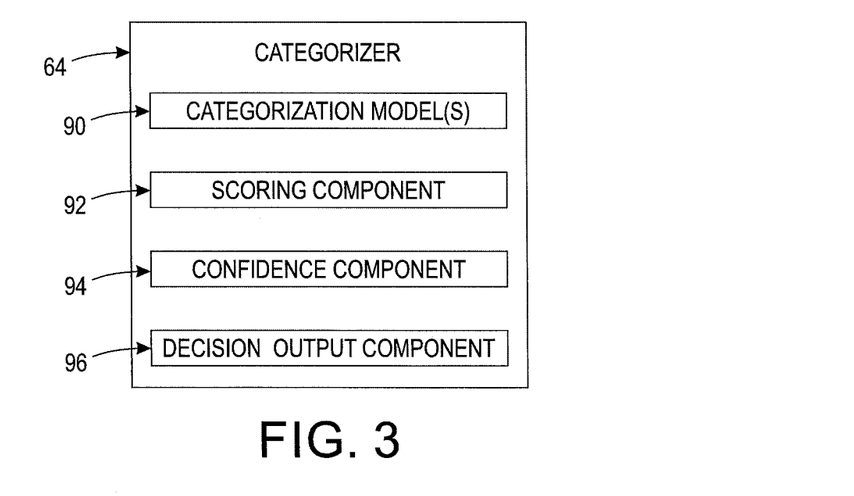
FIG. 3 is a functional block diagram of a categorizer of FIG. 1.

With reference to FIG. 3, the exemplary categorizer 64 includes instructions for accessing one or more categorization (classifier) models 90, embedded in or accessible to the categorizer 64, each of which has been pretrained, based on image signatures of a labeled set of training images. The labels are selected from a finite set of image categories, such as type of document. A scoring component 92 receives the image signatures output by the representation generator 66 and generates a score for the representation with respect to each of at least one categories. In the exemplary embodiment, a single categorization model is provided for all categories, although in other embodiments, one model per category may be provided.

A confidence component 94 compares each category score to a predetermined threshold, one per category. The confidence component determines whether a threshold confidence level has been reached for outputting a decision. If the confidence level has been reached, a decision output component 96 outputs the decision and calls on the representation generator to discontinue features extraction. That is, if a confidence level has been reached for a predetermined number, such as at least one frame or a plurality of frames (e.g., at least two, three, four or five frames), the categorizer tags the current frame of the document with one or more class labels representative of one or more of the set of predefined categories. If the confidence level has not been reached for the predetermined number of frames, the representation generator continues to process successive frames in the sequence until the predetermined number of frames all reach(es) the threshold confidence level for the same category.

With reference once more to FIG. 1, the capture control component 62 (remotely) controls the configuration of the image capture device 32. In particular, prior to the capture of a document image 28, when a user selects a categorization model, the API 38 instructs the image capture device 32 to adjust the parameters to the optimum settings 98 corresponding to the category identified by the categorization model. Once the categorizer 64 recognizes a category of the document image frame 70, the capture control component triggers 62 the image capture device to capture the current frame of the document image. The document image 28 can then be sent to the server for further processing.

As will be appreciated, while the capture control component 62, representation generator 66 and categorizer 64 are illustrated as being located on the server, one or more of these components may be located on the mobile device 12. In some embodiments, the server may be omitted (other than optionally for processing the captured document images).

Figure 4:
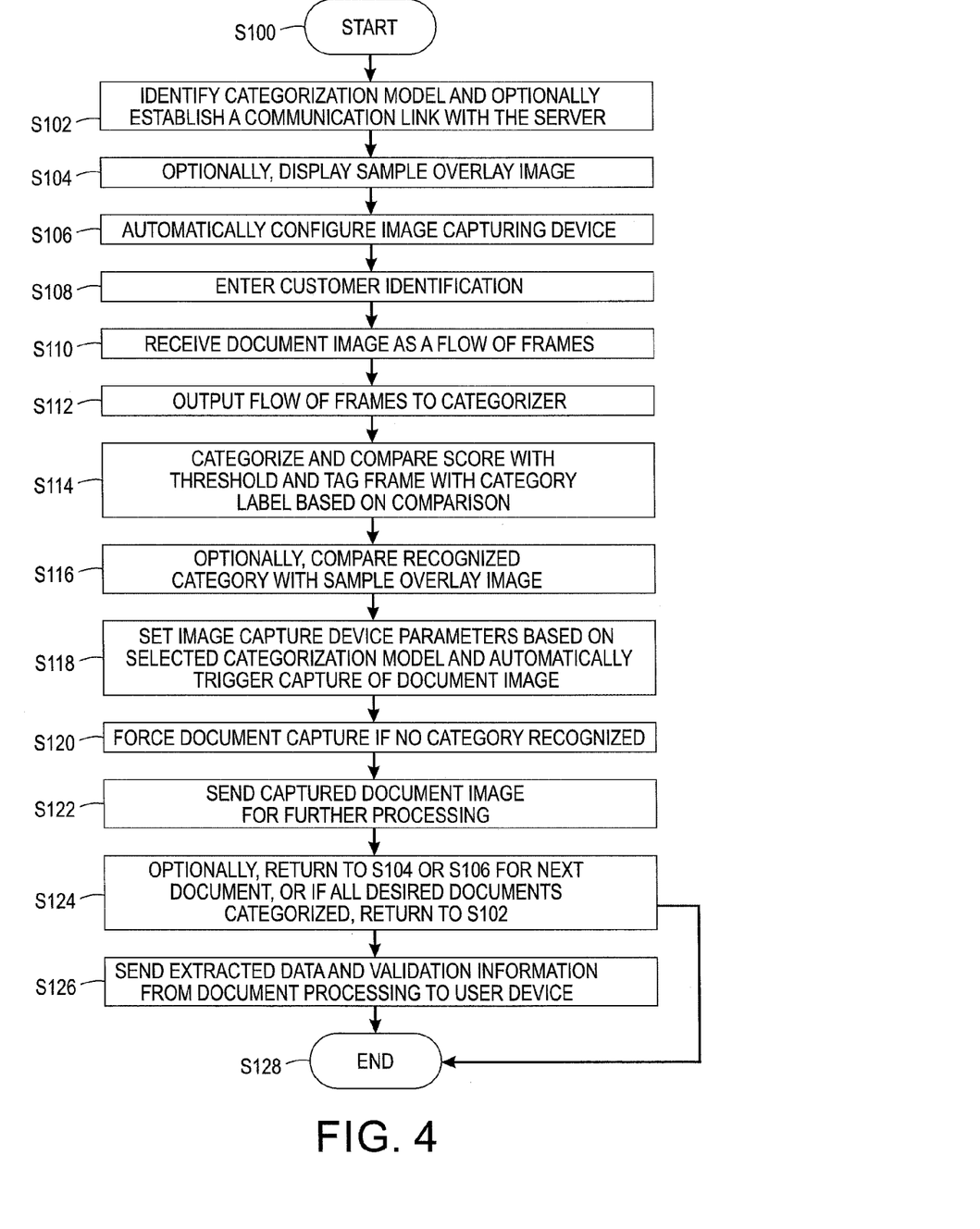
FIG. 4 is a flow chart illustrating a method for remote control of automatic capture of documents.

An exemplary method for controlling capture of a document image captured using a mobile device is briefly outlined in FIG. 4. The method begins at S100.

At S102, a categorization model is identified. In one embodiment, an intelligent mobile application 38 on a mobile device 12 establishes a communication link with the server. The mobile application is able to communicate with the server via the API of the mobile device and the API generator of the server computer. The API generator may provide a displayable interactive interface for communicating with the server which allows a user to select one of a set of categorization models 90, which can be pre-loaded for a document set. The interactive interface may also provide for loading a new categorization model (xml file) for a document set. In other embodiments, the categorization model(s) and categorizer may be loaded and stored on the mobile device. In one embodiment, provision may be made for a user to select one of the categorizer model's categories.

At S104, a semi-transparent overlay of a sample image is optionally displayed, e.g., if a sample image is available for one or more categories of the identified categorization model. The semi-transparent overlay is displayable on the interactive interface of the mobile device to assist capture of the document image.

At S106, the image capture device is automatically configured to capture document images, including matching the document dimensions specified by the category model for all or for one or more of its categories, where different categories are associated with different parameters. The category (e.g., user-selected) may be rejected if the threshold resolution or other camera parameters associated with the category is/are not available on the device.

At S108, a customer identification (ID) is entered through the interactive interface, including associating the document images that will be captured with a customer. The ID may be associated with a predefined set of the model's categories corresponding to a customer's provided document set. The ID may also be associated with an account number corresponding to a customer who has installed the intelligent mobile application.

At S110, the image capture device 32 is instructed to receive a document image displayable on the mobile device as a flow of frames, including assisting the user in positioning the mobile device over the document desired to be captured and fitting the flow of frames within the displayable area of the interactive interface of the mobile device. The designated displayable area may be based on the selected category.

At S112, the flow of frames is output to the categorizer 64, which analyzes the flow of frames at a given rate (e.g., every half-second). The analysis frequency can be adjusted according to the device computing power. An image representation is generated for each frame or at least some frames within the flow of frames.

At S114, the image representation is categorized with the categorizer using the categorizer model. The categorizer score for each category is compared with a threshold for that category and the image representation is tagged with a corresponding category label if the score for the category meets the threshold. This step may be repeated until at least a predetermined number of the frames in the sequence meet the threshold confidence for one of the categories.

At S116, optionally, the recognized category is compared with an image representation of the sample image category, if the selected categorization model has an available sample image. The recognized category is validated if it matches the sample category, based on the comparison.

At S118, image capture device parameters for the image capture device are set based on the recognized category and the selected categorization model and the mobile device automatically captures the document image. The captured image is tagged with the recognized category, and a tactile or auditory alert is activated on the mobile device to signal that the capture has been successful.

At S120, if a category is not recognized, or if a recognized category does not match one of a predefined set of categories for the document set, based on the comparisons performed in S114 and S116, a forced capture of the document image with the image capture device may be permitted. The forced document image capture is displayable on the user device so that the document image category may be validated manually.

At S122, the captured document image from S118 or S120, whose category has been identified, may be sent to the server with the customer ID for further processing.

At S124, the application may return to S104 or S106 if the categorization model is parameterized with a list of documents to be categorized. Then at S104, another semi-transparent overlay of the sample image may be displayed, if another sample image is available for the next document image in the list of documents. If the previous steps S102-S124 have categorized one or more document images based on the categorization model, the application may return to S102, for a new categorization model to be identified for a next set of documents.

At S126, when the categorized document image or images captured from any of the preceding steps are fully processed, e.g., on the server, the extracted data and validation information may be sent back to the user device and may be displayed on the interactive interface thereof.

The method ends at S128.

The functions of the components used to implement the methods detailed above and illustrated in FIGS. 1-3 are more fully described below. As will be appreciated, these components may be software components that may be suitably combined or split into subcomponents.

Categorizer Training of Categories (S106, S118)

The categorizer is trained on one or more categories, typically categories for very similar documents, in order to limit the variability of validated document image captures and maximize the likelihood of successful processing in successive steps of the workflow. When training the categorization models, documents with similar dimensions, layout, and quality may be used as training samples. These parameters may be used as features of the categorization model as parameters for an optimum document image capture. The document dimensions may be stored as parameters to be used by the mobile application to pilot the configuration of the camera prior to capturing the document image. For instance, if the categorization model 90 is trained on documents with average dimensions of about 1600×1250 pixels, the resolution of the camera while capturing documents may be set to 2 megapixels. If the average dimensions are about 1200×800 pixels, the camera resolution may be set lower, such as 1 megapixel.

In addition to the image representation, other features may be considered by the categorization model in assessing the image frame.

For example, the image quality of the document image may be a feature in assessing the image frames. Image quality may be measured by any number of assessment factors, and combinations thereof, such as exposure levels, sharpness, noise, contrast, or the like. These quality factors may be stored as parameters to be used by the mobile application to pilot the configuration of the camera prior to capturing the document image.

Location of anchor points relative to the document dimensions may also be used as a feature of the categorization model in assessing the image frames, the anchor points representing variations of form layouts in different document types and different subsets of document types. Location of zones within different form layouts of document types and subsets may also be included, the zones representing the location of document features relative to the anchor point. Data extraction processes are generally based on zones of the document image which are positioned relative to an anchor point. Training the categorization model on these features ensures that all successive extractions of data or further document processing will be performed successfully.

Automatic triggering of the capture of the document occurs only when the confidence of the categorizer for the document image to be captured meets a threshold for the categorization model. This ensures that all the successive extractions of data or further document processing will be performed successfully.

Sample Images (S104, S116, S120)

A set of sample images can optionally be stored along with the categorization models, wherein one sample image of the set is associated with each categorization model for each document type. The sample image may be automatically set by the application, based on the closest training image to the category centroid, the centroid being computed based on the representations of training images assigned to the category. Alternatively, the sample image may be manually selected when training the categorization model. As discussed below, the application may provide a "Sample Overlay Mode," wherein the sample image is used as a semi-transparent overlay, displayable on the user device, to help the user capture the document correctly, based on the categorization model corresponding to the selected category.

Selection of the Categorization Model

The smart application, through a displayable interactive user interface, may operate in two modes realized by the application. In a first or Classic Mode, the application establishes a communication link with the server. The displayable interactive interface displays a list of categories corresponding to the categorization model(s) which is stored in the application, which can be pre-loaded for a document set. Alternatively, a new categorization model together with its associated thresholds and image dimensions can be loaded (e.g., as an xml file) for a document set. The image capture device is automatically configured to capture document images, including matching the document dimensions specified by the selected category/categorization model. The selected category may be rejected if the required resolution is not available on the device. A customer identification (ID) is entered through the interactive interface, and information associating the document images that will be captured with a customer. The ID may be associated with a predefined set of categories corresponding to a customer's selected document set. The ID may also be associated with an account number corresponding to a customer who has installed the intelligent mobile application. The image capture device is instructed to receive document images displayable on the mobile device as a flow of frames, and the user instructed to position the mobile device over the document desired to be captured for fitting the flow of frames within a displayable area of the interactive interface of the mobile device. The designated displayable area is based on the selected document category. The image capture device parameters are set based on the category recognized by the categorization model and the mobile device automatically captures the document image and the method proceeds through S106-S114 and S118-S128.

An optional, second mode or Sample Overlay Mode is similar to the "Classic Mode," except that, if a sample image is available for the selected or loaded categorization model, a semi-transparent overlay of a sample image is displayed at S104. The semi-transparent overlay is displayable on the interactive interface of the user device to assist capture of the document image. Additionally, in the Sample Overlay Mode, the recognized category may be compared with an image representation of the sample image category at S116, if the selected categorization model has an available sample image. The recognized category is validated if it matches the sample category, based on the comparison. If a recognized category does not match a sample category, based on the comparison, a forced capture of the document image with the image capture device is also permitted in Sample Overlay Mode, so that the document image category may be validated manually. Sample Overlay Mode then proceeds in the same manner as the Classic mode.

Parameterized Categorization Model

The application can optionally be parameterized with a list of documents to be recognized by the categorizer. The list of documents can be a subset of the categories that are defined by the parameterized categorization model. If the categorization model is parameterized with a list of documents, the application may proceed as described for the Classic Mode. Or, if the categorization model is parameterized with a list of documents which are associated with sample images, the application may proceed as described for the Sample Overlay Mode. When the categorization model is parameterized with a list of documents to be categorized, after one document image in the document set is categorized, the application may automatically configure the image capture device to capture images matching the dimensions of the next document image in the list of documents. If after one document image in the document set is categorized, and another sample image is available for the next document in the list of documents, another semi-transparent overlay of the sample image can be displayed. The application proceeds in the Classic Mode or Sample Overlay Mode as detailed, until the application has categorized all desired document images based on the selected categorization model. The application then returns to the interactive user interface, so that a new category may be selected and/or a new categorization model loaded.

Categorizer (S112-S116)

1. Generating Representations for Image Frames

Each respective document image is represented by an image signature 68 generated by image representation generator 66. The image signature can be any suitable high level statistical representation of the image, such as a multidimensional vector generated based on features extracted from the image. Fisher Kernel representations, Bag-of-Visual-Word representations, and runlength histogram representations are exemplary of suitable high-level statistical representations which can be used herein as an image signature. The exemplary image signature is of a fixed dimensionality, i.e., each image signature has the same number of elements.

For example, the representation generator 66 includes a patch extractor component 82, which extracts patches and a feature extraction component 84 which analyzes low level visual features of patches of the current frame of the document image, such as shape, texture, or color features, or the like to generate local descriptors of the patches. The patches can be obtained by image segmentation, by applying specific interest point detectors, by considering a regular grid, or simply by the random sampling of image patches. In some approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the local descriptors are emitted. Each patch can thus be characterized by a vector of weights, one weight for each of the Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, flower, autumn leaves, etc.), characteristic background (e.g., starlit sky, blue sky, grass field, snow, beach, etc.), or the like. Given a frame of a document to be assigned a signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the image signature or input to a generative model which outputs an image signature based thereon.

For example, as local descriptors extracted from the patches, SIFT descriptors or other gradient-based feature descriptors, can be used. See, e.g., Lowe, "Distinctive image features from scale-invariant keypoints," IJCV vol. 60 (2004). The number of patches per image or region of an image is not limited but can be for example, at least 16 or at least 64 or at least 128. Each patch can include at least 4 or at least 16 or at least 64 pixels. In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA). Signatures can be computed for two or more regions of the image and aggregated, e.g., concatenated.

Where two or more different types of low level feature are used, such as SIFT and color, two classifiers may be used as the categorization model. A separate classifier score may thus be obtained for each image representation and the final result (quality score) can be obtained (by an aggregating component) by aggregating the two (or more) scores with late fusion, i.e., averaging the scores of the two systems, (e.g., with equal weights or different weights). Alternatively, the two (or more) image representations, one for color and one for SIFT, are aggregated, e.g., concatenated or combined using early fusion, or otherwise (e.g., through a voting method), to form a single image representation, which is input to a single categorization model.

For computational efficiency reasons, one or more of the following three techniques for generating image signatures which model the distribution of feature sets using fixed-length vectorial representations can be employed: the bag-of-visual-words (BOV), the Fisher vector (FV), and runlength histograms.

a. Bag-Of-Visual-Words (BOV)

In the BOV image representation, an image (or patch) is described by a histogram of quantized local features. (See, for example, U.S. Pub. No. 20080069456). More precisely, given an (unordered) set of the local descriptors, such as set of SIFT descriptors or color descriptors extracted from a training or test image, a BOV histogram is computed per patch. These patch-level representations can then be concatenated or otherwise aggregated to form an image representation (e.g., one for SIFT features and one for color features).

During the training phase, a visual vocabulary, i.e., a set of prototypical features is first learned by automatically clustering a large number of local descriptors from different images, using for example, K-means. Each patch local descriptor (e.g., a 96 or 64 dimensional vector) is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. A Gaussian Mixture Model (GMM) can be used to model the distribution of local features, i.e. there is a probabilistic visual vocabulary. Each Gaussian (function) in the GMM can be identified with a visual word and the clustering of the local descriptors can be performed through standard EM learning of the GMM parameters (mean and covariance of each of the Gaussians and weight of each Gaussian (function) in the GMM). The GMM vocabulary provides a principled way to cope with assignment uncertainty as each local feature is assigned with a probability to all visual words. (see, e.g., J. Farquhar, S. Szedmak, H. Meng, and J. Shawe-Taylor, "Improving "bag-of-keypoints" image categorisation," Technical report, University of Southampton, 2005).

In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given an image to be classified, each extracted feature vector (local descriptor) is assigned to its closest visual word (cluster) in the previously trained vocabulary or to all visual words in a probabilistic manner in the case of a stochastic model.

b. Fisher Vector (FV)

In FV image representation, a Fisher vector (FV) for each patch is computed for the image by modeling the extracted local descriptors of the image using a mixture model to generate a corresponding image vector having vector elements that are indicative of parameters of mixture model components of the mixture model representing the extracted local descriptors of the image. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007). Methods for computing Fisher vectors are more fully described in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., and in Jorge Sanchez, and Thomas Mensink, "Improving the fisher kernel for large-scale image classification," in Proc. $11^{th}$ European Conference on Computer Vision (ECCV): Part IV, pages 143-156 (2010), and in Jorge Sanchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any color photograph if the range of interest is color photographs).

c. Runlength Histograms

In an exemplary embodiment, runlength histograms are used as visual features to represent the images, since they are sensitive to typical distortions (e.g., dimensions, noise, skew, rotation) which may occur. In this embodiment, the current frame of the document image to be categorized is received. A runlength histogram representation of the document can then be generated or separate representations can be generated for different regions of the image. The regions are obtained by partitioning the current frame of the document image. The frame may be partitioned regularly, e.g. into 4×4 regions. Multiple partitions of the current frame of the document can be generated, at different scales. As a result, at least some portions of the frame are included in more than one region. Irregular partitioning methods could alternatively be used, e.g. a partitioning that ensures that all regions contain (approximately) the same number of pixels. By generating histograms for different regions of the image frame and optionally at different scales, differences between images which relate to the document type are reflected in the encoding. When dealing with structured documents, the documents may have different level of structure. For example, the reference number of a form may appear somewhere in the top left quadrant, whereas the title may appear at the top near the center. However, because the document image capturing procedure can result in some shifting of the document content, a feature such as the title may not always appear in the same region if the scale is small (i.e., where the image is divided into a large number of regions). Additionally, the title may appear on page one of the document only. Thus, different features influence the histograms differently at different scales as well as in different locations. While runlengths may be computed without partitioning the document image into plural regions (i.e., using the whole document), results suggest that that considering partitioned regions at different scales is particularly beneficial for structured content, such as forms.

Run lengths are extracted by scanning each line of pixels in the region in a selected direction and identifying runs of pixels. A run is a sequence of pixels with the same colorant quantization value in a selected direction (e.g. horizontal, vertical, diagonal or anti-diagonal). The length of a run is the number of pixels such a sequence contains. In the case of binary images, each run is either all black pixels (quantization value=0) or all white pixels (quantization value=1). More generally, where two or more colorant quantization levels are employed, the pixels in a run all have the same quantization value. The runlength histogram is a histogram of the number of runs for each of M lengths of the runs. In one embodiment, the lengths of the runs are quantized to reduce the number of histogram bins. The quantization may be linear and divide the range of possible run lengths into equal sized intervals. Or, the quantization may be logarithmic or otherwise non-uniformly split to provide discrimination among the more frequently occurring run lengths. As will be appreciated, a run cannot be longer than the total number of pixels in the orientation selected (e.g., rows, columns, or diagonal direction of the image). In the general case, the number of values in the region histogram is M×N×L, where M is the number of pixel run-length quantization levels, N is the number of colorant quantization levels, L is the number of directions, and M, N, and L are all integers.

The region histogram can optionally be normalized. The final image representation or image signature may simply be a concatenation of the region histograms corresponding to each of the regions, which may be stored in the form of a vector of values $(v_1, v_2, v_3, v_4 \ldots v_n)$. is thus representative of the entire, optionally normalized, current frame of the document image.

See, e.g., U.S. Pat. No. 8,249,343 to Perronnin, et al., REPRESENTING DOCUMENTS WITH RUNLENGTH HISTOGRAMS, incorporated herein by reference, for a fuller description of runlength histograms.

2. Training of the Categorization Model

The exemplary categorizer 64 may include one or more categorization models (classifiers) 90 which has/have been trained on a training set. The classifier training stage is a precursor to the exemplary method, i.e., is generally performed prior to the method illustrated in FIG. 4. The classifier(s) 90 may be trained with any suitable linear or non-linear training algorithm, such as Sparse Linear Regression (SLR), Sparse Multinomial Logistic Regression (e.g., for a classifier which classifies into more than two classes), random forests (decision trees), standard logistic regression, neural networks, linear support vector machines (SVM), SVM using radial basis function (RBF) kernels, linear discriminant analysis, naïve Bayes, Perceptrons, polynomials, linear regression, or any other suitable machine learning method.

The document images to be captured may be predominantly or entirely comprised of text, such as scanned medical records, tax forms, business cards, bank checks, bills, ID cards, driver license, passport, or the like. In one aspect, the document images may have at least some structure, such as a template form (e.g., business form) which has various fields for user entries. The fields of the documents allow the template to be personalized, prior to image capturing, and are at least partially completed by a user, making each captured image of the template form slightly different but still retaining the same general structure. The content of the fields may have been generated by handwriting, typing, online entry, or the like. A single document may comprise several pages, each page forming a respective document image when captured. Thus, each categorization model can be trained on image signatures of a large training set of documents, such as the ones listed above, which are manually labeled.

As detailed above, a Fisher vector, "bag-of-visual-words" vector, or runlength histograms can be used as a suitable image signature for the training images. Each model may be trained with both positive examples (training images labeled with that category) and negative samples (training images not labeled with that category). The computed image signature of the current frame of the document image is input into the trained classifier(s), which are able to iteratively transform the image signature into a vector of a scores based on how well the image signature of the current frame of the document image matches the model. The classification may be hard (e.g., a score of "1" if the object is assigned to the class or "0" otherwise), or can be soft (e.g., the classification output is a score between 0 and 1 inclusive with higher values indicating a higher likelihood of membership in the class). A soft classification can be converted to a hard classification by thresholding, wherein a set of thresholds, one per class, is learned along with the classification model. If the highest score is above the threshold associated to the class, the class is assigned to the current frame of the document image. Otherwise, no class is assigned to the current frame.

For example, the classifier may be trained with images manually assigned to one of a set of classes, such as in the case of tax forms, there may be about 20 classes corresponding to 1040-page 1, 1040-page 2, 1040a-page 1, 1040-page 2, Schedule A, Schedule B, etc., respectively. The classifier assigns a class label to a frame of the current document image if a category is recognized, based on its vector representation. The classified images may be presented to a user for review, e.g., on the display.

The categorization model, the sample images, the set of thresholds associated with training images, and the document dimensions may be exported by a suitable software program as an xml file. This xml file can then be read by a complementary runtime program, on which the mobile application can be based.

Document Image Capturing (S118, S120)

The capture control component 62 ensures that the parameters of the image capture device 32 are properly set to obtain an optimum image of the document. The categorizer may specify the optimum parameters, one for each of the set of predefined categories, to ensure a quality document image capture. Once a user selects a category, the smart application automatically configures the camera to capture images matching the parameters set for the categorization model. If some of the required parameters are not available on the device, such as a threshold resolution for a quality image capture, the selected category may be rejected by the application.

During the categorization process, the capture control component 62 can communicate in real-time with the mobile device (e.g., with the API 38, image capture device 32, and/or capture component 40) to cause the mobile device to adjust the configuration of the image capture device. For example, the capture control component 62 instructs capture component 40 to adjust camera settings such as focus, exposure, shutter speed, image stabilization, and/or ISO. Continuously adjusting these settings to account for slight variations in external conditions, such as lighting, shaking, and/or distance from the image capture device to the document, helps to maintain optimum parameters during the categorization process. This capability allows the captured document image to match the image quality of the images used to train the categorizer, based on assessment factors such as sharpness, noise, contrast, or the like. Capture control component 62 makes it more likely for the document image to match the quality of the training images, and less likely for the application to reject the selected category. In addition, the capture control component ensures high quality document images sent to the server, increasing the likelihood of successful processing by the next steps of the work flow.

Once the category decision of the decision output component 96 is output, the capture control component ensures that the proper image capture parameters are set based on the categorization model corresponding to recognized category. The API interface generator 60 then communicates with the API 38 of the mobile device to activate the capture component

40, causing the image capture device to automatically trigger a capture of the document image 28. The image can be output to the server for further document processing, or stored in the server memory in any convenient file format for later processing, such as JPEG, GIF, JBIG, BMP, TIFF, or other common file format used for images and which may optionally be converted to another suitable format prior to further processing, such as OCR.

Document Processing (S122, 130)

The document image 28 to be processed may be captured by an image capture device 32, such as a camera, webcam, or the like. The document to be captured may be individual images, such as scanned document images, photographs or combined images which include photographs along with text, and/or graphics, or the like. The categorizer analyzes document images analyzed as a flow of frames. The document image is captured automatically when the categorizer recognizes a category assigned to the current frame. The document image is securely sent to the server computer for further processing by a document processor 72.

The document processor 72 receives the captured image 28 and may process it to identify text sequences. In particular, the document processor 72 may performs optical character recognition ("OCR") on the document image 28 to extract text data from the document. The document processor segments the document into a set of text sequences, which may include over segmenting some data elements. The document processor outputs the text sequences which are stored in database along with location information, such as the neighborhood of adjacent text sequences. The document processor 72 may be suitably included as software with instructions for segmenting the image and extracting the text characters contained in the image so as to provide layout and font information. The document processor 72 outputs a text file comprising text sequences, including their arrangement of characters, positions, and font sizes to the database. These may be combined to form a document representation of lines of text and separators. The OCR output may be encoded in XML or other markup language format. The document processor generally operates based on a pattern recognition algorithm or algorithms which identify characters based on matching with expected character shapes.

The use of the exemplary categorizer 64 avoids increased document processing time due to common errors or uncertainties in OCR extraction. In existing systems, categorization and document processing of a pre-captured document image (usually a scanned document) are performed on a remote server. The scanned document images are sent to the remote processing server, where the image is categorized, then depending on the document type, OCR is run and data extracted according to a pre-defined template. However, in the case of mis-categorized or non-categorized documents, relevant data extraction may be missed, and manual categorization and extraction may have to be performed by a human. Categorization can be a challenging, time consuming process if the scans are of poor quality or if the document image is distorted. This difficulty increases when the scan is replaced by a photograph taken by a user using a mobile device, such as a smartphone or tablet.

The present system and method address some of the challenges faced by document processing of captured or scanned documents such as 1) OCR sensibility to document dimensions and form factor: for instance, A4 documents and small form-factor documents such as ID cards will have the same image size, which leads to a wide range of text sizes which can impact the ability of the document processor to perform OCR. In this case, very small fonts may not be readable, but characters which are tool large may also be missed when OCR extraction is performed. The present system addresses this by associating a predetermined size or range of image sizes with each category.

(2) Poor exposure or irregular lighting of the document capture. The present system addresses this by adjusting image capture parameters and waiting until a frame with acceptable quality is obtained before capturing the image.

(3) Image distortions such as rotation or skew: existing technologies are useful to correct these issues post-image capture. However, they entail a significant amount of tuning and work in order to provide an efficient correction of each document type which may be captured by the mobile device. Furthermore, these post-capture processing procedures can have a significant impact on overall document processing time. The present system addresses this with a sample template image and by waiting until a frame with acceptable quality is obtained before capturing the image.

(4) Changes in dimensions of the capture image: data extraction processes are generally based on zones of the document image which are positioned relative to an anchor point. For instance, with respect to an ID card, the text "DRIVER LICENSE" may be used as an anchor. Other zones such as last name, first name, address, and birthdate are located relative to the "DRIVER LICENSE" anchor. If the dimensions of the image change, the location of the zones relative to the anchor will be incorrect. Such changes in dimensions can have a significant impact on successful OCR extraction and overall processing time. The present system addresses this with pre-defined image dimensions and/or a sample template image.

By using a categorization step prior to image capture, more efficient capture of customer documents can be achieved. A user is able to validate that captured document images sent to the server match the expected document types, increasing the likelihood that the document image will be processed quickly, efficiently, and accurately as possible by the document processor 72 or other successive steps which may be necessary for a given workflow. By capturing image documents with the smart application based on the mobile device's built in image capture device 32 and the categorizer 64, numerous benefits may be obtained. For instance, much more accurate and automated end-to-end document processing is achieved because the quality of the documents sent to the processing chain is controlled at the source. Human intervention can be reduced by ensuring automation of document processing, achieved by the ability to match the format of the captured document with training documents. Finally, turnaround time, the time between which the user has finished scanning and sending the document to which the answer is received by the "validation" of the documents, can be reduced if more automation and less human intervention is required.

The exemplary system and method thus facilitate control of the quality of the digital document images sent to a processing chain at the source, reducing the need for subsequent image correction and/or human intervention.

The system and method provide a mobile device controller which implements the categorization step, and an application where a categorizer guides the user through the automatic capture of a document, so that efficient document capture and validation can be performed prior to further processing in a workflow.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computers, (for example, an internal hard drive of RAM), or may be separate (for example, an external hard drive operatively connected with the computer), or may be separate and accessed via a digital data network such as a local area network (LAN) or the Internet (for example, as a redundant array of inexpensive of independent disks (RAID) or other network server storage that is indirectly accessed by the computers, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method. As will be appreciated, while the steps of the method may all be computer implemented, in some embodiments one or more of the steps may be at least partially performed manually.

As used herein, a "plurality" means at least two.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for controlling document image capture comprising:
    identifying a categorization model for categorizing image frames;
    configuring an image capture device, based on the identified categorization model;
    receiving a flow of frames of a same document captured with the configured image capture device;
    generating an image representation for each of a plurality of frames within the flow of frames;
    with the identified categorization model, for each of the plurality of frames, assigning a confidence for at least one category to the frame based on the image representation; and
    assigning a category to the document when a threshold confidence for one of the at least one categories is assigned; and
    triggering an automatic capture of an image of the document based on the assigned category,
    wherein at least one of the configuring of the image capture device, generating of the image representation, assigning a confidence, and assigning a category is performed by a processor.

2. The method of claim 1, wherein the identifying of the categorization model comprises providing for a user to load a new categorization model.

3. The method of claim 1, further comprising storing a set of parameters for the categorization model, the parameters comprising at least one of document dimensions, quality, and form layout, the parameters being compared with the document frames in the configuring of the image capture device.

4. The method of claim 1, further comprising adjusting the image capture device in real-time in response to external conditions, based on the identified categorization model.

5. The method of claim 1, further comprising training the categorization model on a set of training images, the set of training images each comprising a category label and an image signature, the labels being selected from a finite set of image categories.

6. The method of claim 1, further comprising providing for forcing the capture of a frame via the image capture device when the score for at least one of the plurality of frames does not meet the threshold.

7. The method of claim 6, further comprising providing for a user to manually assign a category to the forced captured frame.

8. The method of claim 1, wherein the image representations are based on runlength histograms.

9. The method of claim 1 wherein the category is assigned only when each of a plurality of frames meets the threshold confidence for that category.

10. The method of claim 1, wherein the document includes a set of documents and the method includes for each document in turn, configuring the image capture device based on one of the categories, receiving a flow of frames, generating image representations, assigning a confidence, and triggering the automatic capture of the respective document.

11. The method of claim 1, wherein the configuring of the image capture device, generating of the image representation, assigning a confidence, and assigning a category are performed on a mobile device which includes the image capture device.

12. The method of claim 1, wherein the at least one category comprises a plurality of categories.

13. The method of claim 1, further comprising:
    storing a set of sample images, each of the sample images in the set corresponding to a respective one of each of the categories; and
    displaying a semi-transparent overlay of one of the sample images in the set for assisting a user in positioning the image capture device for capturing the image.

14. The method of claim 13, further comprising:
validating the assigned category with an image representation of the displayed semi-transparent overlay of the sample image.

15. The method of claim 1, further comprising:
sending the captured image to a server for processing after validating that the captured document image matches one of the at least one categories.

16. A computer program product comprising a non-transitory recording medium which stores instructions which when executed by a computer, perform the method of claim 1.

17. A system comprising memory which stores instructions for performing the method of claim 1 and a processor in communication with the memory for executing the instructions.

18. A system for controlling document image capture comprising:
- an image representation generator which receives a flow of frames of a same document captured with an image capture device and generates an image representation for each of a plurality of frames within the flow of frames;
- a categorizer for categorizing image frames with a categorization model, for each of the plurality of frames, the categorizer assigning a confidence for at least one category to the frame based on the respective image representation and the model, the categorizer assigning a category to the document when a threshold confidence for one of the at least one category is assigned;
- a capture control component for configuring the image capture device, the capture control component triggering an automatic capture of an image of the document with the image capture device based on the assigned category; and
- a processor which implements the image representation generator, categorizer, and capture control component.

19. The system of claim 18, wherein the capture control component configures the image capture device based on parameters stored in the categorization model.

20. A method comprising:
- configuring an image capture device of a mobile device, based on parameters of a categorization model;
- receiving a flow of frames of a same document captured with the configured image capture device;
- with a representation generator of the mobile device, generating an image representation for each of a plurality of frames within the flow of frames;
- with a categorizer of the mobile device, for each of the plurality of frames, assigning a confidence for at least one category to the frame based on the image representation; and
- assigning a category to the document when a threshold confidence for one of the at least one categories is assigned to a plurality of frames; and
- triggering automatic capture of an image of the document based on the assigned category,
- wherein at least one of the configuring of the image capture device, generating of the image representation, assigning a confidence, and assigning a category is performed by a processor.

\* \* \* \* \*